(12) United States Patent
Glickman et al.

(10) Patent No.: US 9,780,949 B2
(45) Date of Patent: Oct. 3, 2017

(54) DATA PROCESSING DEVICE AND METHOD FOR PROTECTING A DATA PROCESSING DEVICE AGAINST TAMPERING

(71) Applicants: Eran Glickman, Rishon Le Zion (IL); Ron Bar, Ramat Hasharon (IL); Benny Michalovich, Raanana (IL)

(72) Inventors: Eran Glickman, Rishon Le Zion (IL); Ron Bar, Ramat Hasharon (IL); Benny Michalovich, Raanana (IL)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 14/905,207

(22) PCT Filed: Jul. 24, 2013

(86) PCT No.: PCT/IB2013/056073
§ 371 (c)(1),
(2) Date: Jan. 14, 2016

(87) PCT Pub. No.: WO2015/011526
PCT Pub. Date: Jan. 29, 2015

(65) Prior Publication Data
US 2016/0182229 A1      Jun. 23, 2016

(51) Int. Cl.
*H04L 29/06*     (2006.01)
*H04L 9/10*      (2006.01)
(Continued)

(52) U.S. Cl.
CPC ............. *H04L 9/10* (2013.01); *G06F 21/558* (2013.01); *G06F 21/86* (2013.01); *H04L 2209/12* (2013.01)

(58) Field of Classification Search
CPC ........................................................ H04L 9/10
See application file for complete search history.

(56) References Cited

U.S. PATENT DOCUMENTS

| 6,675,297 B1 * | 1/2004 | Ignaszewski | ........... G06F 21/62 380/277 |
| 7,234,645 B2 * | 6/2007 | Silverbrook | ............... B41J 2/14 235/454 |

(Continued)

FOREIGN PATENT DOCUMENTS

| EP | 2602952 A1 | 6/2013 |
| WO | 02080445 A1 | 10/2002 |

OTHER PUBLICATIONS

International Search Report for International application No. PCT/IB2013/056073 dated Apr. 29, 2014.

*Primary Examiner* — Shawnchoy Rahman (57) ABSTRACT

A data processing device comprises a protection key unit, a dummy key unit, and a control unit. The protection key unit provides a protection key. The dummy key unit provides a dummy key. The dummy key unit has a set of two or more allowed dummy key values associated with it and is configurable by a user or a host device to set the dummy key to any value selected from said set of allowed dummy key values. The control unit is connected to the dummy key unit and to the protection key unit and arranged to set the protection key to the value of the dummy key in response to a tamper detection signal (fatal_sec_vio) indicating a tamper event. The value of the dummy key may notably be different from zero.
A method of protecting a data processing device against tampering is also described.

14 Claims, 4 Drawing Sheets

(51) Int. Cl.
    *G06F 21/55*    (2013.01)
    *G06F 21/86*    (2013.01)

(56) References Cited

U.S. PATENT DOCUMENTS

| | | |
|---|---|---|
| 7,613,924 B2 | 11/2009 | Shankar et al. |
| 8,175,276 B2 | 5/2012 | Tkacik et al. |
| 8,645,735 B1 * | 2/2014 | Ardis .................. G06F 1/3275 |
| | | 340/541 |
| 2002/0048369 A1 * | 4/2002 | Ginter .................. G06F 21/10 |
| | | 380/277 |
| 2004/0234073 A1 | 11/2004 | Sato et al. |
| 2006/0005248 A1 * | 1/2006 | Wu ..................... G06F 21/121 |
| | | 726/26 |
| 2009/0126030 A1 | 5/2009 | Walmsley |
| 2013/0044881 A1 | 2/2013 | Chang |

\* cited by examiner

DATA PROCESSING DEVICE AND METHOD FOR PROTECTING A DATA PROCESSING DEVICE AGAINST TAMPERING

FIELD OF THE INVENTION

This invention relates to a data processing device and to a method for protecting a data processing device against tampering.

BACKGROUND OF THE INVENTION

A digital data processing device may comprise a cryptographic means for encrypting or decrypting internal data residing on the device. A given data item may be encrypted using a cryptographic key. A cryptographic key is a parameter defining an encryption function and its inverse, the corresponding decryption function. Applying the encryption function to the data item generates an encrypted data item different from the original data item. Applying the decryption function to the encrypted data item reproduces the original data item. Interpreting or otherwise using the encrypted data item therefore requires knowledge of the cryptographic key. Data items may thus be rendered unintelligible for any person or device not knowing the respective cryptographic key. A cryptographic key may in turn be encrypted using another cryptographic key. A cryptographic key may also be referred to herein as a key. A key used for encrypting or decrypting another key is known as a master key.

Some devices are provided with a tamper detection mechanism. The tamper detection mechanism may be arranged to generate a tamper detection signal in response to detecting a tamper event. Tampering, also known as hacking, refers to any successful or unsuccessful attempt of gaining unauthorized access to protected data on a device. The protection mechanism may be arranged to clear a key in response to detecting a tamper event related to that key. Clearing a key means resetting the key to a predefined value, typically zero. When a key has been reset, the key cannot longer be used to decrypt data that was encrypted on the basis of the original value of the key. For instance, it may be detected that a hacker attempts to read a certain key on the device. The key may be cleared before the hacker is able to read it. The hacker is thus prevented from gaining knowledge of the correct value of the key in question, i.e., from knowing the value necessary for decrypting the data that was encrypted using the key.

Certain devices have a key known as the zeroizable master key (ZMK). The ZMK is typically used to encrypt data that are in turn is used to protect sensitive information stored on or conveyed by the device. The ZMK may be arranged to be cleared, e.g., set to zero, once a hacking attempt is detected, hence its name. The ZMK may, for example, be programmed by a manufacturer of the device and then locked to prohibit any further read or write transactions by unauthorized entities, and tampering protection may be activated. The ZMK may be programmed, for example, in accordance with an individual key distribution scheme of the manufacturer or the user. The tampering mechanism may be aimed at protecting against a variety of security violations. Such violations may include hacking by software or by physical means. It is noted that some hacking methods result in zeroing the key, thus creating an indication of the hacking method's success and allowing the mapping of various hacking methods' success rate.

SUMMARY OF THE INVENTION

The present invention provides a data processing device and a method for protecting a data processing device against tampering as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
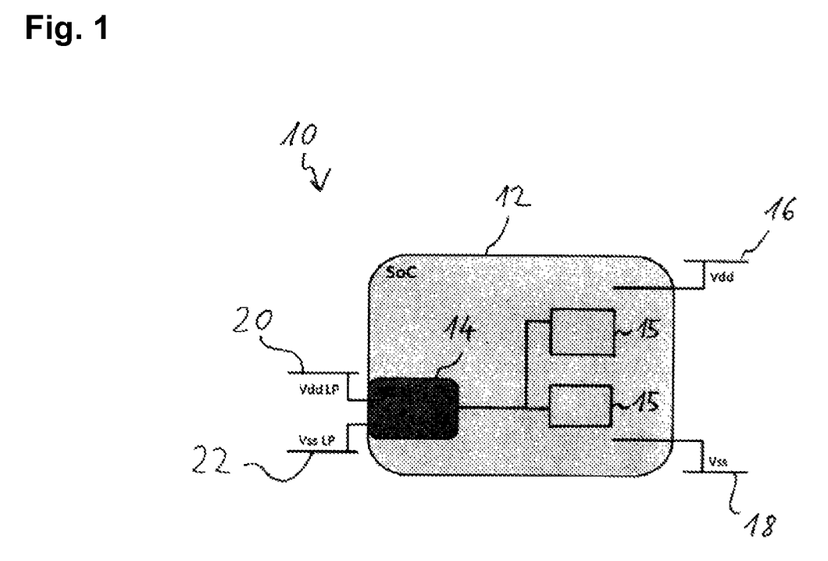
FIG. 1 schematically shows an example of an embodiment of a data processing device.

FIG. 1 schematically shows an example of a data processing device 10. The data processing device 10 may be a system on chip (SoC) 12 or any other kind of digital data processing device. The data processing device 10 may, for example, be distributed across one or more chips. The device 10 may comprise first input power terminals 16, 18 connectable to, e.g., a power supply for powering the device 10. The power supply (not shown) may, for example, be a battery, a set of batteries, or an AC to DC converter.

The device 10 may comprise one or more functional units 15. Each of the functional units 15 has certain data processing capabilities. Although only two functional units 15 are shown in the Figure, the device may contain fewer or more than two functional units. The functional units may be suitably interconnected to exchange data among them. One or more functional units 15 may be arranged to encrypt or decrypt data on the basis of a protection key. For instance, the functional units 15 may include a dedicated cryptographic unit (not shown) for encrypting newly received or newly generated data on the basis of the protection key, thereby rendering the data unintelligible to any entity not knowing the protection key. The cryptographic unit may be one of the functional units 15 or be dispersed across a group of functional units. The cryptographic unit may further be arranged to decrypt encrypted data on the basis of the protection key, thereby restoring the original non-encrypted data. In another example, the device 10 may lack a dedicated cryptographic unit, and each or at least one of the functional units 15 may be arranged to encrypt and decrypt its own data, e.g., upon receiving the data from another unit and prior to providing it to another unit.

More than one protection key may be used within the device 10. For instance, different functional units 15 may use different protection keys. Alternatively, a common protection key may be used by two or more functional units 15. The one or more protection keys used within the device 10 may be stored within the device 10 in an encrypted form. A master key may be provided within the device 10 for decrypting the one or more protection keys. The master key is a particular example of a protection key.

The solution proposed herein is applicable, at least in principle, to any kind of protection key. For instance, it is applicable to an apparatus having only a single protection key. Similarly, it is applicable individually to each key among a set of different protection keys used within a device. In particular, it is applicable to a master key.

Still referring to FIG. 1, the device 10 may comprise a secure unit 14. The secure unit 14 comprises a protection key unit 44 (see FIG. 4) for providing a protection key, e.g., a master key. The one or more functional units 15 or a subset thereof may be connected to the protection key unit 44 so as to be able to read the protection key provided by the protection key unit 44. They may thus be enabled to encrypt or decrypt data on the basis of the protection key. As explained above, the data to be encrypted or decrypted may comprise one or more subordinate protection keys. A subordinate protection key is a protection key other than the master key. In a variant of the shown example, one or more of the functional units 15 may be integrated in the secure unit 14.

In the shown example, the secure unit 14 is arranged to be kept permanently on power. The protection unit 14 may, for example, be connected or connectable to a secure power supply 20, 22 different from the main power supply 16, 18. The secure power supply 20, 22 may, for example, be provided by a battery or a set of batteries. The secure power supply 20, 22 may be integrated in the device 10. The secure power supply 20, 22 may be designed to remain operational over the entire lifetime of the device 10, e.g., over a period longer than 2, 5, 10, or even longer than 20 years. The device 10 may have an on state in which the device 10 is on power and an off state in which it is off power. The secure unit 14, in contrast, may be arranged to remain permanently on. When the device 10 is in its on state, the power consumption of the secure unit 14 may be negligibly low compared to the power consumption of the rest of the device 10. The voltage provided by the secure power supply 20, 22 may also be significantly lower than the voltage provided by the main power supply 16, 18.

Figure 2:
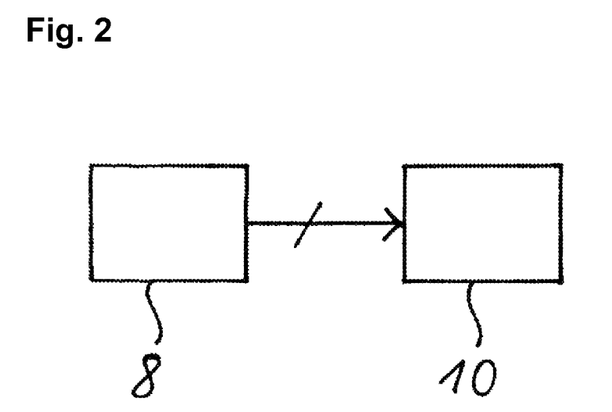
FIG. 2 schematically shows an example of a data processing device connected as a target device to a host device.

An example of a mode of operation of the device 10 will be described by making additional reference to FIGS. 2 and 3. The device 10 may be connected, in a configuration process, to a host device 8 (see FIG. 2). The device 10 may in this situation be referred to as the target device. The host device 8 may, for example, be a general purpose processor. The host device 8 may be arranged to write data to or read data from the device 10 using a suitable communication protocol, e.g., jtag. It is also possible for the host device 8 to be integrated inside the device 10, e.g., as a part of the system on chip, making the communication between the host device 8 and the device 10 internal. In this case, the communication protocol may be a protocol that is suitable for internal communication.

The secure unit 14 may be arranged to provide, in addition to the protection key, a dummy key capable of replacing the protection key. The dummy key may be provided in a compressed format in order to save memory. The dummy key may, for example, be defined and stored in terms of a seed. An explicit representation of the dummy key may be generated from the seed by applying a predefined seed function to the seed. The seed function may, for example, be implemented in the form of a wiring mesh as will be described later on in reference to FIG. 4.

Figure 3:
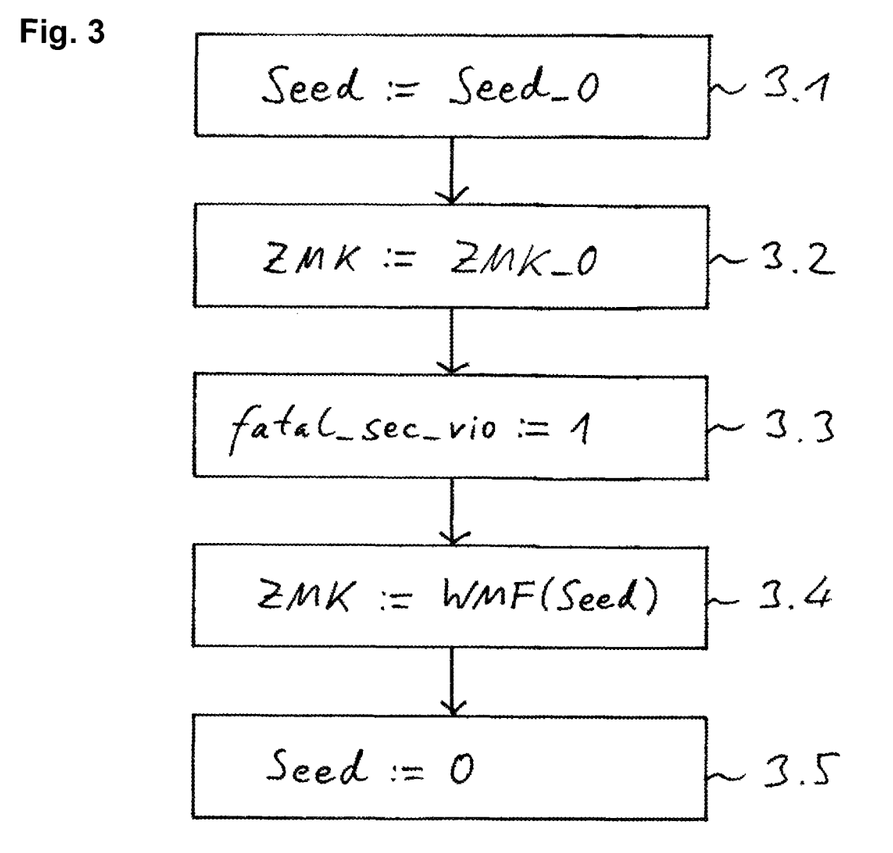
FIG. 3 shows a flowchart of an example of an embodiment of a method of protecting a data processing device against tampering.

The configuration process may comprise setting both the protection key and the dummy key to initial values (boxes 3.1 and 3.2 in FIG. 3). For example, the protection key may be set to a first value (box 3.2). The dummy key may be set to a second value (box 3.1) different from the first value. The first value may also be referred to as the original value or functioning value. The second value may also be referred to as the false value, fake value, or dummy value. As explained above, the dummy key may be defined in terms of a seed. As this may limit the set of possible values for the dummy key, it may be convenient to define first the seed (box 3.1) and thus the dummy key and then to select a protection key (box 3.2) different from the thus defined dummy key. The host device 8 may then be disconnected from the target device 10 or from the secure unit 14, whereby the configuration process may be terminated. The configuration process may be integrated in a manufacturing process for producing the device 10. In other words, the protection key and the dummy key may be set when the device 10 is still in an unfinished state, e.g., when a housing of the device 10 has not yet been mounted. Alternatively, the protection key and the dummy key may be set when the device 10 is physically complete.

Manufacturing the device 10 may notably comprise providing the device 10 with a tamper detection unit for detecting attempts of hacking the device 10. The tamper detection unit or parts thereof may be integrated in the secure unit 14 to ensure that they are permanently on power. In response to detection of a tamper event (box 3.3), the tamper detection unit sets the protection key, e.g., the master key, to the value of the dummy key (box 3.4). In other words, the value of the protection key is replaced by the value of the dummy key in response to detection of the tamper event. As the value of the dummy key differs from the original value of the protection key, it cannot be used to decrypt any data on the device 10 that was encrypted on the basis of the original value of the protection key. The device 10 may thus be rendered at least partly unusable. The value of the dummy key, i.e., said second value, may conveniently be chosen in accordance with a key distribution scheme of the manufacturer or user of the device 10. The second value may notably be non-zero. A hacker of the device 10, e.g., a person who triggered the detected tamper event, is thus deprived of any immediate feedback as to whether his or her hacking attempt has been successful. Notably, if the second value is in accordance with the key distribution scheme, the hacker will not be able to tell from the second value alone whether this is the original value or a fake value. The hacker will therefore find it more difficult to decide whether he or she should continue the hacking attempt.

It may be beneficial to set the dummy key to a new value (box 3.5) after setting the protection key to the value of the dummy key (box 3.4). A potential hacker reading both the dummy key and the protection key will thus see a protection key different from the dummy key, preventing him or her from knowing immediately that the protection key has been set to the value of the dummy key. In other words, the fact that the protection key has been set to a false value may be concealed. The dummy key may, for instance, be set to zero. The value of zero may be particularly beneficial over a non-zero value as it may be implemented using particularly simple hardware. Alternatively, the dummy key may be set (box 3.5) to any other value different from the new value of the protection key, i.e., different from said second value.

The first value, i.e., the value to serve as a functioning protection key, can in principle be chosen randomly. Alternatively, it can be chosen in accordance with a certain key distribution scheme. For example, the device 10 may be declared to belong to a certain class among a set of different classes, e.g., classes A, B, and C. One example of a key distribution scheme may consist in assigning a certain protection key value, i.e., a first value, to all devices in class A and another protection key value, i.e., another first value, to all devices in classes B and C. The dummy key values may be specified accordingly, i.e., a certain second value for class A and another second value for classes B and C. A hacker who hacks devices from class A will thus see the same protection key for each of these devices. In contrast, when the hacker hacks a device from class A and device from class B, he or she will see different keys. The present solution allows the generation of a dummy key in a manner that is similar to generating the correct key. In the above example, all devices from class A will generate the dummy key of class A, and all devices from classes B and C will generate the dummy key of classes B and C whereas devices from classes A and B or from classes A and C will generate different keys.

Figure 4:
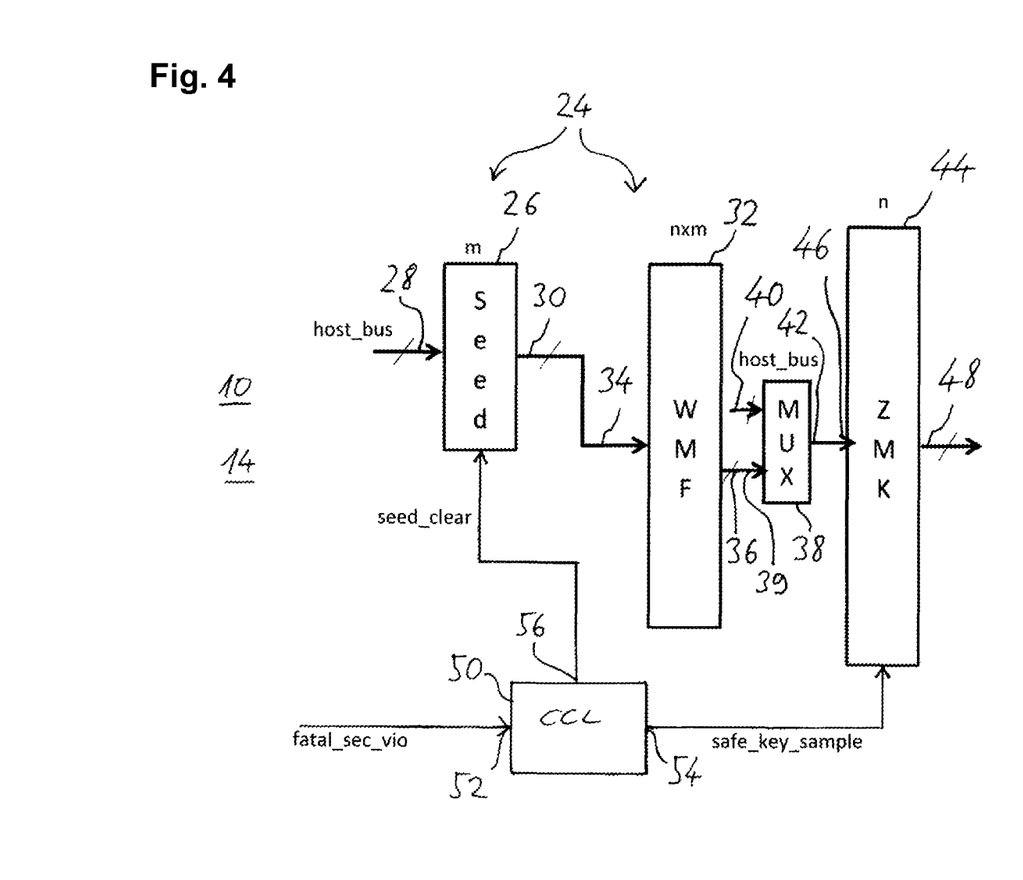
FIG. 4 schematically shows an example of an embodiment of a cryptographic key memory unit.

Referring now to FIG. 4, an example of an embodiment of a secure unit 14 is shown. As explained above, the secure unit 14 may be arranged to be permanently on power. The secure unit 14 may, for example, comprise a seed unit 26 having an input 28 and an output 30, a wiring mesh unit 32 having an input 34 and an output 36, a multiplexer 38 having inputs 39 and 40 and an output 42, and a protection key unit 44. The seed unit 26 and the wiring mesh unit 32 together form a dummy key unit 24. The secure unit 14 may further comprise a control unit 50 connected or connectable to the dummy key unit 24 and to the protection unit 44. The seed input 28 and the multiplexer input 40 may be connectable to the host device 8 (see FIG. 2). In the present example, the seed output 30 may be connected to the wiring mesh input 34. The wiring mesh output 36 may be connected to the multiplexer input 39. The multiplexer output 42 may be connected or connectable to the protection key input 46. The protection key output 48 may be connected or connectable to, e.g., the functional units 15 (see FIG. 1).

The protection key unit 44 may provide a protection key, e.g., a master key. The dummy key unit 24 may provide a dummy key. The protection key unit 44 and the dummy key unit 24 may be connectable to the host device 8 so as to enable the host device 8 to set the protection key to a first value and the dummy key to a second value different from the first value. The control unit 50 is arranged to set the protection key to the value of the dummy key in response to detection of a tamper event.

In this example, the dummy key may be defined by a seed provided by, e.g., the seed unit 26. The seed may, for example, be a bit sequence of length m. The protection key may be a bit sequence of length n. Conveniently, n is greater than m. Mathematically, the protection key may be related to the seed in terms of a binary matrix of dimension n*m, i.e., having n lines and m columns. A binary matrix is a matrix with binary entries, i.e., each element of the matrix is either 0 or 1. The protection key ZMK may be related to the seed as: ZMK=wmf*seed, wherein wmf is the aforementioned binary matrix of dimension n*m.

In a variant (not shown) of the present example, the seed unit 26 and the wiring mesh unit 32 are replaced by a memory cell for containing the dummy key in the form of a binary sequence, i.e., a bit sequence of length n. The present example is slightly more complex than this variant but may have lower power consumption as only m instead of n bits are stored for providing the dummy key.

The seed unit 26 and the protection key unit 44 may, for example, be implemented as volatile memory cells. For instance, the seed unit 26 may be implemented in the form of a set of m binary memory elements, e.g., flip-flops. Similarly, the protection key unit 44 may be implemented as a set of n binary memory elements, e.g., flip-flops. Considering that each flip-flop requires a certain amount of power for it to retain its state, a reduction in the number of flip-flops for the dummy key compared to the number of flip-flops for the protection key may result in a noticeable power-saving and hence, if these flip-flops are powered by a battery, in an increase of the lifetime of the battery.

The secure unit 14 may be arranged to operate, for example, as follows. In a configuration process, a host device, e.g., the host device 8 in FIG. 2, may be connected to or integrated in the present data processing device 10, thereby connecting the host device to the seed input 28 and to the multiplexer input 40. The multiplexer 38 may be controlled to output at its output 42 the signal received at its input 40, i.e., a signal from the host device 8. The host device 8 may then be operated to write a seed value to the seed unit 26 via the input 28 and to write a protection key value (said first value) to the protection key unit 44. The wiring mesh unit 32 converts the seed value into said second value and provides the second value at its output 36. The control unit 50 may output at its output 54 a sample signal, e.g., safe_key_sample=0, thereby prompting the protection key unit 44 to sample, i.e., to read, the first value via its input 46. The control unit 50 may thus control the protection key unit 44 to set the protection key to the first value. The host device 8 may then be disconnected from the device 10 or from its interface with the secure unit 14. The protection key stored in the protection key unit 44, now having the first value, may be used to encrypt data or decrypt data or both. The seed value and the protection key value may be expected to be conserved as long as the secure unit 14 is kept on power. At the same time, the multiplexer 38 may be controlled to deliver at its output 42 the input received via its input 39, i.e., the second value, provided by, e.g., the wiring mesh unit 32.

When the control unit 50 receives a tamper detection signal, e.g., fatal_sec_vio=1, indicating the detection of a tamper event via its input 52, it may respond, for example, by issuing a second sample signal, e.g., safe_key_sample=1, via its output 54, to the protection key unit 44, thus prompting the protection key unit 44 to resample the output from the multiplexer 38. The protection key may thus be set to the second value, i.e., the value output by the dummy key unit 24 via the output 36. The device 10 may thus be rendered at least partly unusable.

A short while after issuing the second sample signal, the control unit 50 may issue a seed clear signal, e.g., seed_clear=1, via its output 56, thereby zeroing the seed in the seed unit 26. The dummy key is thereby also set to zero.

Once this procedure is finished, the secure unit 14 may show no trace of the transactions taken to erase and protect the first value key.

Figure 5:
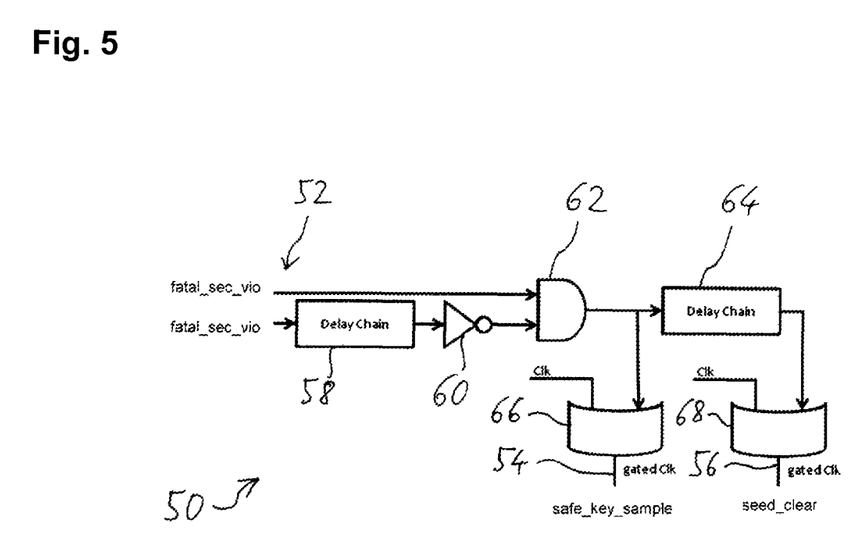
FIG. 5 schematically shows an example of an embodiment of a control unit of the cryptographic key memory unit shown in FIG. 4.

FIG. 5 shows an example of an embodiment of a control unit 50. In this example, the control unit 50 comprises a delay unit 58, e.g., a delay chain, an inverter 60, an AND gate 62, a second delay element 64, e.g., a second delay chain, a first clock gate 66, and a second clock gate 68. These components may be interconnected. Specifically, the input 52 may be connected to a first input of the AND gate 62 directly and to a second input of the AND gate 62 via the first delay element 58 and the inverter 60. The output of the AND gate 62 may be connected to a second input of the clock gate 66 directly and to a second input of the clock gate 68 via the delay unit 64. Each of the clock gates 66 and 68 may have a first input for receiving a clock signal Clk, for example. In operation, the same clock signal Clk may be fed to the clock gates 66 and 68.

When a tamper event is detected, the tamper detection signal received at the input 52 may change from, e.g., low to high, i.e., 0 to 1. Accordingly, the output of the AND gate 62 will be high for a certain finite period having a duration identical to the delay of the delay unit 58. This duration should be at least approximately two clock cycles to ensure that the outputs 54 and 56 will be high for periods sufficiently long for the seed unit 26 and the protection key unit 44 to react. The second delay unit 64 ensures that the seed clear signal will be generated only after the protection key has been set to the value of the dummy key.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, circuitry for zeroing the dummy key upon setting the protection key to the value of the dummy key may be incorporated in the dummy key unit 24 or in the protection key unit 44 rather than in the control unit 50.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermodal components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the secure unit 14 and the functional units 15 may be located on a single integrated circuit, as shown in FIG. 1. Alternatively, the examples may be implemented as any number of separate integrated circuits or separate devices interconnected with each other in a suitable manner. For example, one or more functional units of the data processing device 10 may be connected to or otherwise coupled to the secure unit 14 but located on a separate device (not shown).

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A data processing device, comprising:
    a protection key unit for providing a protection key;
    a dummy key unit for providing a dummy key, wherein the dummy key unit has a set of two or more allowed dummy key values associated with it and is configurable by a user or a host device to set the dummy key to any value in a set of two or more allowed dummy key values; and
    a control logic connected to the dummy key unit and to the protection key unit and arranged to set the protection key to the value of the dummy key in response to a tamper detection signal indicating a tamper event, wherein the protection key unit comprises a set of n binary memory elements for representing the protection key and wherein the dummy key unit comprises a set of m binary memory elements for representing the dummy key, wherein m is less than n.

2. The data processing device of claim 1, wherein the control unit is arranged to set the dummy key to a new value upon setting the protection key to the value of the dummy key.

3. The data processing device of claim 2, wherein said new value of the dummy key is zero.

4. The data processing device of claim 1, wherein the protection key unit and the dummy key unit are connectable to a host device so as to enable the host device to set the dummy key to any value in said set of two or more allowed dummy key values.

5. The data processing device of claim 1, comprising a secure unit arranged to be kept continuously on power, the secure unit-comprising at least the protection key unit, the dummy key unit, and the control unit.

6. The data processing device of claim 5, wherein the secure unit comprises one or more batteries arranged to keep it continuously on power.

7. The data processing device of claim 1, wherein said binary memory elements are flip-flops.

8. The data processing device of claim 1, wherein the dummy key unit comprises:
    a seed unit for providing a seed representative of the dummy key, the seed having a bit length of m; and
    a wiring mesh circuit having an input connected to the seed unit and an output connected or connectable to the protection key unit, wherein the wiring mesh unit defines a binary matrix and is arranged to multiply the seed by said binary matrix to generate a wiring mesh output value representative of the dummy key, the wiring mesh output value having a bit length of n which is greater than m.

9. The data processing device of claim 1, comprising one or more functional hardware units connected to the protection key unit and arranged to encrypt or decrypt data on the basis of the protection key.

10. The data processing device of claim 1 wherein the protection key has a first value and the dummy key has a second value different from the first value.

11. The data processing device of claim 10, wherein the second value is non-zero.

12. The data processing device as set forth in claim 10, wherein said first value is chosen at random.

13. A method of protecting a data processing device against tampering, comprising:
    providing within the data processing device a protection key and a dummy key, the dummy key having a non-zero value different from the protection key;
    detecting a tamper event; and
    in response to the detection of the tamper event, setting the protection key to the value of the dummy key, wherein the protection key is a bit sequence of length n and the dummy key is a bit sequence of length m, wherein m is less than n.

14. The method of claim 13, further comprising, after said operation of setting the protection key to the value of the dummy key:
    zeroing the dummy key.

* * * * *